United States Patent Office 3,832,296
Patented Aug. 27, 1974

3,832,296
ELECTROWINNING CELL AND METHOD WITH PROVISION FOR ELECTROLYTE CIRCULATION
David L. Adamson, and William M. Tuddenham, Salt Lake City, Utah, assignors to Kennecott Copper Corporation, New York, N.Y.
Filed Aug. 7, 1972, Ser. No. 278,220
Int. Cl. C22d 1/02, 1/16
U.S. Cl. 204—106                                      8 Claims

ABSTRACT OF THE DISCLOSURE

An electroyltic cell and method for electrowinning metal values, such as copper, from an electrolyte solution. Each of the anode electrodes of the cell is surrounded by a porous shield, preferably constructed of a material known as plastic frit. Each shield is open at top and bottom, to provide, in effect, a chimney around the anode, extending upwardly from a point above the cell bottom to a point below the surface of electrolyte solution in the cell. The oxygen evolved at the surface of the insoluble anode during operation of the cell rises upwardly in the electrolyte within the shield and induces upward flow of such electrolyte, resulting in circulation thereof from bottom to top of the cell within the shield and from top to bottom of the cell exteriority of the shield. The electrolyte flows upwardly in close proximity to the anode, over the top of the shield, and downwardly across the face of the adjacent cathode, thereby maintaining a high concentration of available metal ions at the cathode-solution interface to improve deposition quality and to achieve higher current density in the cell. The porosity of the shield permits ions in the electrolyte to pass through the shield in either direction, thereby avoiding excessive ohmic resistance between the electrodes.

BACKGROUND OF THE INVENTION

Field

Figure 1:
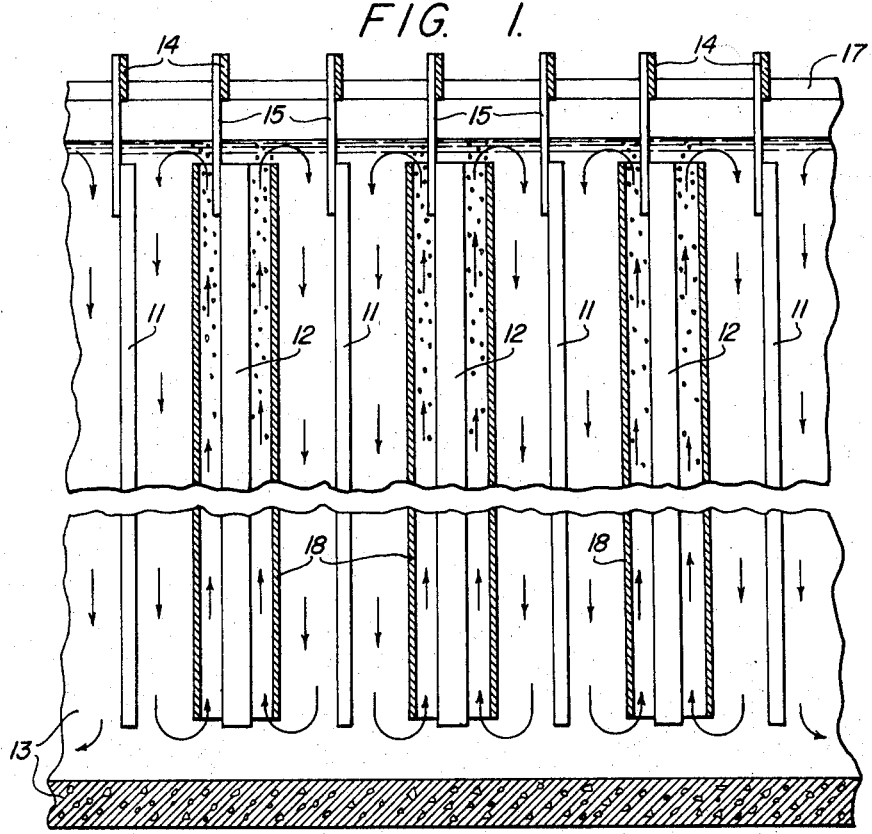

The invention relates to the electrowinning of metal values from electrolyte solutions in electrolytic cells and to the construction of such cells.

State of the Art

In the electrowinning of metal values from solutions carrying such values, e.g. pregnant leach solutions, as electrolytes, the rate of metal deposition on the cathodes is limited by the availability of metallic ions at the cathode-solution interface. If the metallic ions become substantially depleted at such interface, the metal deposit on the cathode is of poor quality and is accompanied by high cathode overvoltage and poor current efficiency in the cell. In most electrowinning cells, the ions at the cathode-solution interface are replenished by natural diffusion of metal ions, electrolyte convection, and circulation induced by the flow of electrolyte in and out of the cell. A lesser amount of circulation results from the free evolution of oxygen gas at the insoluble anode. Even the combined effect of all these factors is frequently insufficient, however, to prevent metallic ion depletion at the interface. In such situations, mechanical means, such as electrolyte pumps and air injection at the bottom of the cell, are frequently employed to increase the circulation of the electrolyte within the cell. Such mechanical systems, however, require complicated cell design and give rise to increased labor and maintenance costs. These systems have, therefore, found only limited application in the electrowinning of metals.

Objectives

It was an objective in the making of this invention to provide an electrowinning cell and method capable of producing a high degree of electrolyte circulation within the cell by utilizing the oxygen produced at the insoluble anode as the motive force. It was also an objective to provide an electrowinning cell and method wherein the quality of metal deposited on the cathode is improved and current density within the cell is increased.

SUMMARY OF THE INVENTION

In accordance with the invention, an improved electrolytic cell for electrowinning metal values from solution is provided. As in conventional electrowinning cells, the improved cell preferably has a plurality of alternately positioned cathodes and insoluble anodes, but each anode is provided with a tubular shield fabricated of porous material. The shield is open at both upper and lower ends, and extends from a point above the bottom of the cell to a point below the surface of electrolyte in the cell. The precise positioning of the shield with respect to the cell and to the working faces of the anode depends upon the size of the cell and the number of electrodes in it.

As oxygen gas is generated at the insoluble anode, bubbles of oxygen rise within the shield to the surface of the electrolyte, creating a "chimney effect" which induces circulation of the electrolyte within the cell. Thus, the rising oxygen draws electrolyte from the bottom of the cell into the open lower end of the shield, where it rises and flows over the top of the shield and then downwardly across the surface of the cathode with sufficient velocity to prevent metal ion depletion at the cathode-solution interface. The porosity of the shield permits the flow of ions in both directions through the shield so as to avoid excessive ohmic resistance between the electrodes.

THE DRAWING

Figure 2:
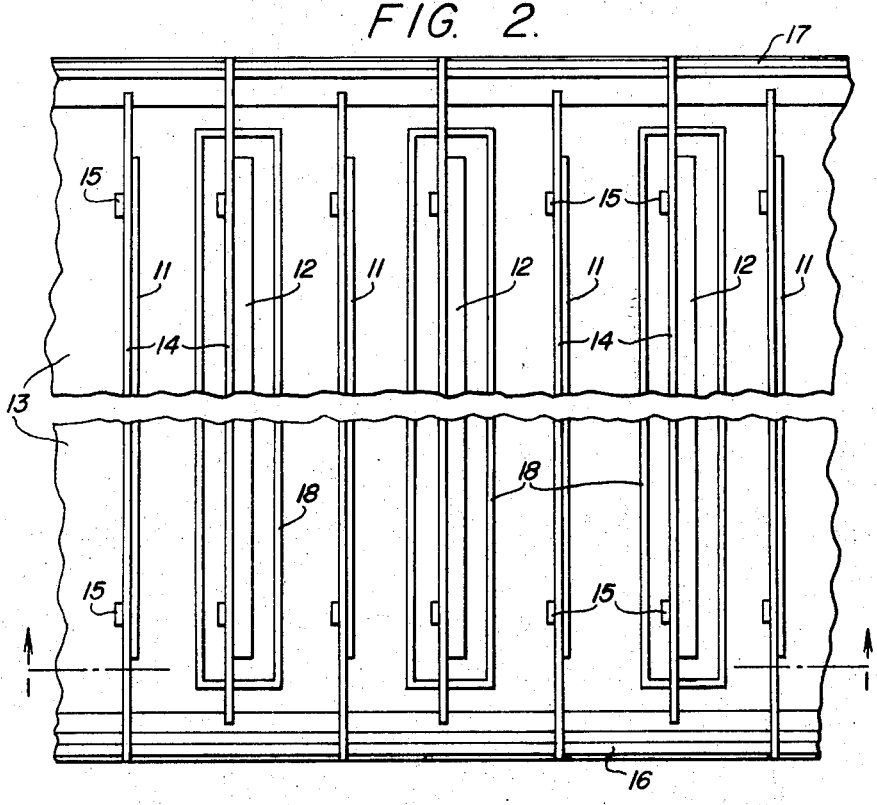

The best mode presently contemplated of carrying out the invention is illustrated in the accompanying drawing, in which:

FIG. 1 is a fragmentary, longitudinal, vertical section through an electrowinning cell equipped with chimney-forming shields around the respective anodes, the view being taken along line 1–1 of FIG. 2 and an intermediate portion being broken out for convenience of illustration with flow of the electrolyte indicated by appended arrows; and FIG. 2, a fragmentary top plan view of the same cell.

DETAILED DESCRIPTION OF THE ILLUSTRATED EMBODIMENT

The illustrated embodiment of electrowinning cell of the invention is adapted for electrowinning copper from an electrolyte solution containing copper ions, although the cell can be employed for electrowinning other metals from solution. The cell has a plurality of spaced-apart cathodes 11 and anodes 12 disposed in alternating relationship in a conventional electrolytic tank 13 constructed of protectively lined concrete or other material impervious to acid. Sets of electrodes 11 and 12 depend from corresponding suspension bus bars 14 extending laterally across tank 13, and are attached to the bars by means of conventional suspension hangers 15.

The bars 14 supporting the cathodes rest at one end on and make electrical contact with an elongate electrical conductor 16 extending along the top of one side wall of tank 13, and the bars 14 supporting the anodes rest at the opposite end on and make electrical contact with a similar elongate electrical conductor 17 of opposite polarity extending along the top of the opposite side wall of tank 13, all in conventional manner. The spacing between cathodes 11 and anodes 12 can vary, but in this embodiment is preferably approximately two inches center to center. Typical commercial cells contain from twenty to fifty anodes and a like number of cathodes. Both cathodes and anodes have dimensions somewhat smaller than the inner dimensions of the cell to permit circulation of electrolyte solution within the cell around all surfaces of the electrolytes.

The cathodes 11 are normally copper starting sheets or blanks of inert metal, such as titanium or stainless steel, from which the copper deposits can be stripped after deposition. Anodes 13 are normally of inert metal, such as lead or platinized titanium, which is insoluble.

Surrounding each anode 12 in the cell in spaced relation thereto, preferably from one-half to one inch, is a tubular porous shield 18, here shown as rectangular in configuration in order to comprehend the rectangular plate anode. Such shield is preferably fabricated of a porous plastic frit, such as polyethylene or polypropylene frit, which is commonly used for segregating particulate matter in fluid suspension. The shield forms, in effect, a chimney around the anode, and is preferably disposed with its open lower end about one inch from the cell bottom and about one-half inch above the bottom of the anode. The open upper end of the shield is preferably about one and a half to two inches below the surface of the electrolyte. These indicated distances are not critical, but in any given instances such distances must be sufficient to permit effective circulation of the electrolyte into, through, and out of the shield.

As oxygen bubbles are generated at the anode-electrolyte interface, they are channeled upwardly within the confines of the shield to the surface of the electrolyte. The rising oxygen bubbles induce upward flow of electrolyte within the shield and thereby create a chimney effect, drawing electrolyte upwardly from the bottom of the cell, through the shield, and out its upper end to flow downwardly across the face of the adjacent cathode, thereby maintaining a high concentration of copper ions at the cathode-electrolyte interface. Circulation of electrolyte continues in this manner at each set of electrodes during operation of the cell, as indicated by the appended arrows in FIG. 1. Because the shields 18 are porous, ions in the electrolyte pass freely therethrough and minimize ohmic resistance between the cathodes and anodes. Although the aforementioned resinous frit material is preferred, other materials, such as spun glass, have requisite porosity and can be used in fabricating the shields.

Electrolyte velocities of over ten times those of conventional cells have been achieved near the cathode surfaces. Such velocities have been found to result in considerably higher than usual quality deposits of metal on the cathode and increased current efficiencies within the cell.

EXAMPLE

An electrolyte solution containing 8 grams per liter of copper and 100 grams per liter of $H_2SO_4$ was placed in an electrolytic cell constructed in accordance with the invention. Copper was electrowon from the solution at 50° C. and 20 a.s.f. current density. A solid and continuous deposit of copper metal was produced on the cathode. Under a variety of conditions of current density, temperature, and copper ion concentration levels, the cell performed with superior results.

In another trial run, the shield was removed and the cell was operated under the same conditions, resulting in the production of a very loose, powdery deposit of poor quality.

Whereas this invention is illustrated and described herein with respect to the best mode presently contemplated of carrying it out in practice, it is to be understood that many variations are possible without departing from the inventive concepts set forth in the claims.

What is claimed is:

1. An electrolytic cell for electrowinning metal values from an electrolyte solution containing same, comprising a tank; at least one set of electrodes made up of an insoluble anode and a cathode; and an open-ended tubular shield of porous material surrounding the anode laterally in spaced relation thereto and extending upwardly from a location above the bottom of the cell to a location below the normal level of electrolyte solution in the cell, said shield being adapted to confine and channelize into upward flow oxygen bubbles generated at the anode, so as to induce circulation of electrolyte upwardly within the shield and downwardly across the face of the cathode.

2. An electrolytic cell as set forth in Claim 1, wherein the shield extends upwardly from somewhat above the bottom edge of the anode to somewhat below the normal level of electrolyte solution in the cell.

3. An electrolytic cell as set forth in Claim 2, wherein the shield is composed of a plastic frit material approximately 1/8 inch to 3/16 of an inch in thickness.

4. An electrolytic cell as set forth in Claim 3, wherein the plastic frit material is selected from the group consisting of polyethylene and polypropylene.

5. A method of electrowinning a metal from a solution containing dissolved values thereof, comprising subjecting a body of such a solution to electrolysis as an electrolyte in an electrolytic cell containing at least one cathode electrode on which metal ions from said solution are deposited and at least one insoluble anode electrode which generates bubbles of oxygen gas during operation of the cell; confining migration of the bubbles of oxygen gas generated at each anode to a vertical ascent in proximity to the anode without unduly restricting migration of metal ions in the electrolyte between the electrodes; and inducing, by means of said vertical ascent of the bubbles of oxygen gas, an upward flow of solution about the faces of said anode and a corresponding downward flow of solution about the faces of said cathode, said upward and downward flow of the solution constituting continuous circulation of electrolyte across the faces of both anode and cathode during operation of the cell.

6. A method as set forth in Claim 5, wherein the metal values in solution are copper values and the metal deposited on the cathode is copper.

7. A method as set forth in Claim 5 wherein the migration of the bubbles is confined by an open-ended tubular shield of porous material which laterally surrounds the anode.

8. A method as set forth in Claim 7, wherein there are a plurality of cathodes and anodes disposed in alternating relationship with each anode being surrounded by one of said tubular shields.

References Cited

UNITED STATES PATENTS

| 2,204,506 | 6/1940 | MacDougall | 204—272 |
| 1,441,568 | 1/1923 | Fink | 204—108 |
| 3,567,595 | 3/1971 | Yates | 204—206 |
| 3,647,672 | 3/1972 | Mehandjiev | 204—278 |
| 3,567,617 | 3/1971 | Krönig et al. | 204—266 |
| 3,404,083 | 10/1968 | Kircher | 204—272 |

JOHN H. MACK, Primary Examiner

R. L. ANDREWS, Assistant Examiner

U.S. Cl. X.R.

204—105 R, 253, 256, 266